US011314630B1

(12) United States Patent
Perumal et al.

(10) Patent No.: US 11,314,630 B1
(45) Date of Patent: Apr. 26, 2022

(54) CONTAINER CONFIGURATION RECOMMENDATIONS

(71) Applicant: International Business Machines Corporation, Armonk, NY (US)

(72) Inventors: Apparsamy Perumal, Bangalore (IN); Sagar Krupa Satya Kunavarapu, Bengaluru (IN); Nikhil Baba Bobba, Guntur (IN); Vijay Ekambaram, Chennai (IN); Murugesan Boopathy, Vellore (IN)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 17/121,421

(22) Filed: Dec. 14, 2020

(51) Int. Cl.
    G06F 9/44       (2018.01)
    G06F 11/36      (2006.01)
    G06K 9/62       (2022.01)
    G06F 11/30      (2006.01)
    G06F 11/34      (2006.01)

(52) U.S. Cl.
    CPC ........ *G06F 11/3688* (2013.01); *G06F 11/302* (2013.01); *G06F 11/3409* (2013.01); *G06F 11/3692* (2013.01); *G06K 9/6256* (2013.01); *G06K 9/6263* (2013.01)

(58) Field of Classification Search
    None
    See application file for complete search history.

(56) References Cited

U.S. PATENT DOCUMENTS

| | | | |
|---|---|---|---|
| 6,931,630 B1 | 8/2005 | Cotner | |
| 8,713,562 B2 | 4/2014 | Dain | |
| 9,122,562 B1* | 9/2015 | Stickle | G06F 8/71 |
| 10,412,154 B2 | 9/2019 | Vyas | |
| 10,608,911 B2* | 3/2020 | Nickolov | G06F 8/65 |
| 10,684,940 B1* | 6/2020 | Kayal | G06F 11/368 |
| 2021/0135983 A1* | 5/2021 | Farnham | H04L 45/306 |
| 2021/0216444 A1* | 7/2021 | Gefen | G06F 11/3688 |

FOREIGN PATENT DOCUMENTS

CN    109117164 A    1/2019

OTHER PUBLICATIONS

Alon, U., et al., "Learning Distributed Representations of Code." Published Oct. 30, 2018. 30 pages. Published by ARXIV. https://arxiv.org/abs/1803.09473.

Anonymous. "A system and method of adaptive testing scope recommendation with cognitive learning system." Published Jan. 24, 2017. 7 pages. Published by IP.com. https://priorart.ip.com/IPCOM/000248952.

(Continued)

*Primary Examiner* — Qamrun Nahar
(74) *Attorney, Agent, or Firm* — Heather Johnston

(57) ABSTRACT

A processor may identify an occurrence of a code change for a microservice hosted in a container. The processor may generate a representation of the code change. The processor may identify, utilizing an AI model, a set of microservice containers having microservices affected by the code change. The processor may determine recommended changes to system environments for one or more microservice containers of the set of microservice containers.

20 Claims, 6 Drawing Sheets

(56) References Cited

OTHER PUBLICATIONS

Anonymous. "CI-CD for Monorepo on Kubernetes." Accessed Jul. 16, 2020. 7 pages. Published by Infracloud. https://www.infracloud.io/monorepo-ci-cd-helm-kubernetes/.

Anonymous. "Updating a Deployment." Accessed Jul. 16, 2020. 10 pages. https://cloud.google.com/deployment-manager/docs/deployments/updating-deployments.

Bruch, M., et al., "Learning from examples to improve code completion systems." Published Aug. 2009. 11 pages. ESEC/FSE '09: Proceedings of the 7th joint meeting of the European software engineering conference and the ACM SIGSOFT symposium on The foundations of software engineering, pp. 213-222. Amsterdam, Netherlands. https://doi.org/10.1145/1595696.1595728.

Engler, D., et al., "Bugs as Deviant Behavior: A General Approach to Inferring Errors in Systems Code." Published Sep. 2001. 16 pages. SOSP '01: Proceedings of the eighteenth ACM symposium on Operating systems principles. pp. 57-72. Published by SOSP '01. Banff, Canada. https://doi.org/10.1145/502034.502041.

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

CONTAINER CONFIGURATION RECOMMENDATIONS

BACKGROUND

The present disclosure relates generally to the field of containerized microservices, and more specifically to determining system environments for microservice containers.

The use of microservices is an architectural design for building a distributed application. In this architectural style, an application is broken down into independent, loosely-coupled, and individually deployable services. Microservices are packaged in containers which allow the applications to move between environments and run independently. The containers may include everything to run the application, other than an operating system, including code, run time, system tools, and libraries.

SUMMARY

Embodiments of the present disclosure include a method, computer program product, and system for determining system environments for microservice containers.

A processor may identify an occurrence of a code change for a microservice hosted in a container. The processor may generate a representation of the code change. The processor may identify, utilizing an AI model, a set of microservice containers having microservices affected by the code change. The processor may determine recommended changes to system environments for one or more microservice containers of the set of microservice containers.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
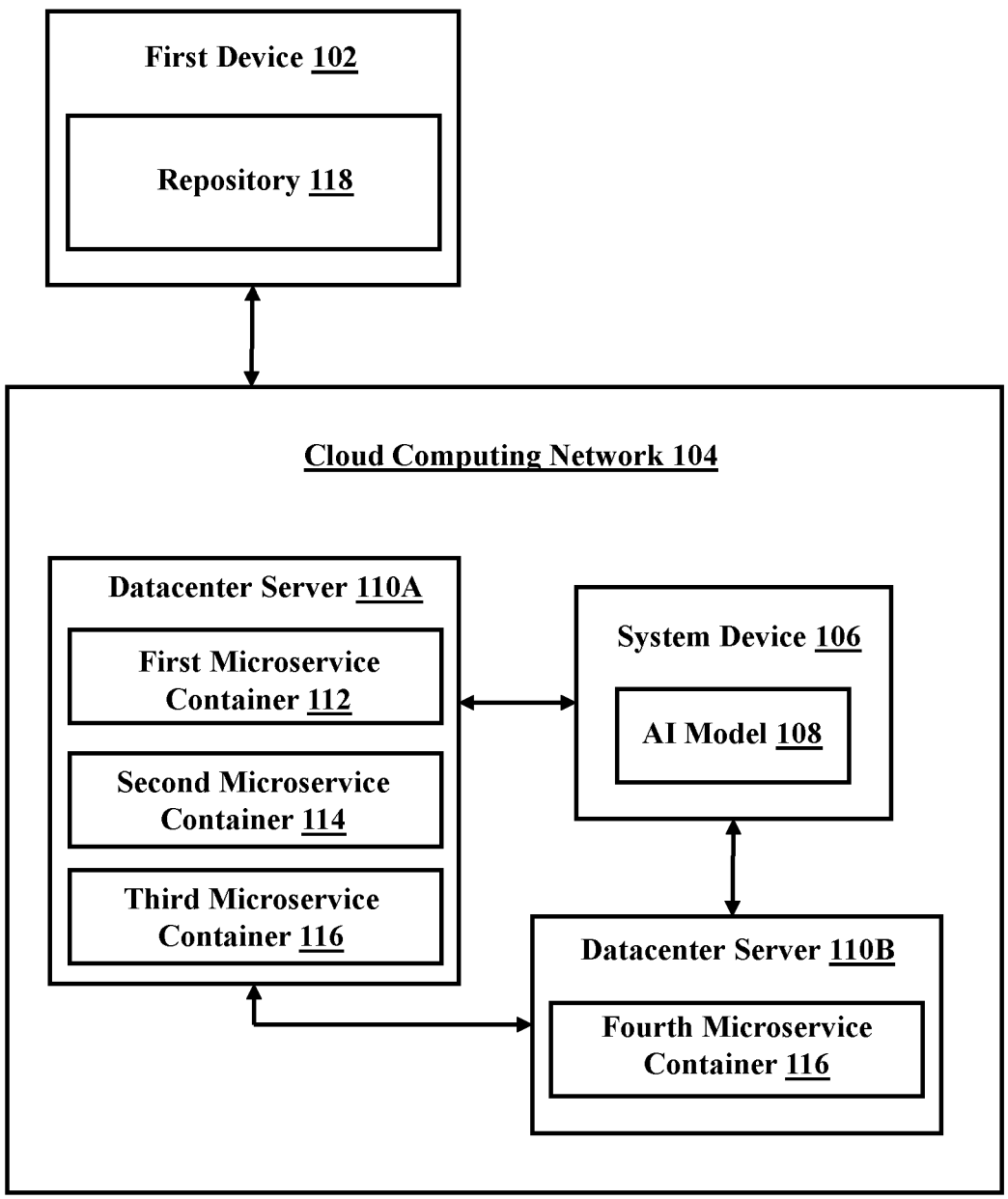
FIG. 1A is a block diagram of an exemplary system for determining system environments for microservice containers, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of containerized microservices, and more specifically to automatically determining system environments for microservice containers. While the present disclosure is not necessarily limited to such applications, various aspects of the disclosure may be appreciated through a discussion of various examples using this context.

In some embodiments, a processor may identify an occurrence of a code change for a microservice hosted in a container. In some embodiments, the code change occurrence may be a change in the computer programming code for a microservice. In some embodiments, the code change may be a commit operation/change that sends the changes to code to a repository where code to be implemented is stored. In some embodiments, the repository may be a monolithic repository in which code changes can be deposited by multiple projects or multiple users. In some embodiments, the code change may be a change to common libraries or third party libraries in the repository. As an example, the code change occurrence may relate to searching a database for database entries. The code change occurrence may change the method of searching the database entries from a linear search method (e.g., searching each entry one by one) to a binary search method (e.g., the database entries are ordered and a database entry in the middle of the database is compared to the target value). This small change in functionality improves the complexity of the computation from O(n) to O(log(n)), which results in an opportunity to save computational resources significantly.

In some embodiments, the processor may generate a representation of the code change. In some embodiments, the representation of the code change may be a way to represent the code that can be quantified and input into a prediction model, such as an artificial intelligence ("AI") model. In some embodiments, the representation of the code change may express the function performed by the code change. In some embodiments, the representation for the code change may express the function performed by the code (e.g., code change) as a vector. For example, the code2vec neural model may be used to decompose the code into abstract syntax trees. The model may learn the atomic representation of each path while simultaneously learning how to aggregate a set of them. The code2vec model may represent snippets of code as continuous distributed vectors. The code2vec model may learn useful method name vectors that capture semantic similarities, combinations, and analogies.

In some embodiments, the processor may identify (based on the representation for the code change and), utilizing an AI model, a set of microservice containers having microservices affected by the code change. Continuing the previous example, the AI system may be trained to identify which microservices are affected by the code change that may affect the way searches for database entries are performed (e.g., switching from performing linear searches to performing binary searches). In some embodiments, the microservices affected by the code change may be microservices that perform similar functions as the code change. The similarity of functions may be determined based on the similarity between representations for the code change (e.g., adding a new library, upgrading the existing library, etc.) and representations of the function performed by the microservices.

In some embodiments, the processor may determine recommended changes to system environments for one or more microservice containers of the set of microservice containers. In some embodiments, as a result of the code change, the container configurations for microservices affected by the code change may also change (e.g., the baseline or optimal container configurations may require less memory or computational resources to perform the new function). In some embodiments, when the function performed by the microservice are changed (e.g., performing a binary search method rather than a linear search method), the system environments for the containers packaging the microservice may be changed.

For example, the system environment may specify configurations for the containers packaging the microservices, including number of processors, types of processors, amounts of memory, diskspace, types of storage, network etc. Continuing the previous example, if the database has 1 million entries, searching for database entries accessed by one individual using a linear search method would involve at least one million comparisons as each entry in the database is searched to determine if the particular individual accessed it. Searching the database using a binary search method would involve 6 comparisons, as log(1 million)=6. Therefore, when the code change involves switching from a linear to binary search method, system environments for the containers packaging the microservices may be changed as the code change resulted in much less computational requirements.

The AI system may recommend changes to system environments of some or all of the microservice containers affected by the code change. The change from conducting linear searches of database entries to conducting binary searches of database entries may require less computational resources. In some embodiments, recommended container configuration changes/system environments for the one or more microservice containers may include recommendations for the amount of memory required by the container, the number and type of processors (e.g., CPU or GPU), the locations for the microservice containers (e.g., if less processing power is required to perform a task, fewer microservice containers may be needed and the locations of the microservice containers may be changed), the amount and type of storage required by the container (e.g., to deal with network latency issues), the network configuration changes required by the container.

For example, the processor may recommend that container A, which performed the microservices relating to searching the database for entries made by one individual, have its system configurations changed from 3 CPU and 2 GB RAM to 1 CPU and 0.25 GB RAM, and that container B, which performed the microservices relating to searching the database for entries made by a group of individual, have its system configurations changed from 4 CPU and 4 GB RAM to 2 CPU and 2 GB RAM.

In some embodiments, identifying a set of microservice containers may include determining one or more container dependencies. In some embodiments, container dependencies may arise when the functions performed by a set of microservices in respective containers are related to each other. In some embodiments, container dependencies may arise when the output of one microservice containers is used to perform the function(s) of one or more other microservices (e.g., in one or more microservice containers). As an example, the microservice in one container may perform the function of searching a database for a particular entry. Another five containers have microservices that utilize that particular entry to perform their functions. The five containers are dependent on the first container that provides the particular database entry output. In some embodiments, the AI model is trained to determine container dependencies (e.g., connected files) as secondary parameters.

In some embodiments, the processor may automatically apply the recommended changes to system environments. In some embodiments, the recommended changes may allow the microservices to run without interruption. For example, if the system configurations are to be changed from 3 CPU and 2 GB RAM to 1 CPU and 0.25 GB RAM based on a code change for container A, the system configuration changes for all the containers that the AI model recommended should have system environment changes automatically applied. In some embodiments, updated container configuration may be applied over the next deployment or scheduled restart of a container. In some embodiments, the recommended changes may be the topmost recommended changes based on feasibility.

In some embodiments, the AI model may be trained using historical data correlating microservice container system specifications and microservice performance metrics. In some embodiments, the system specifications for microservice containers may set out parameters for various factors, including, but not limited to: container size, container memory, container performance usage based on history of resource consumption, the number of API calls, weights of processes, number of processors used, etc. In some embodiments, the performance metrics for a microservice may relate to the quality of the performance of the functions of the microservice. Performance metrics may include the time consumed for a process, the memory consumed by the process, the number of failures of the process, network metrics (e.g., network availability, utilization, timeout patterns, and latency) for the process, etc. In some embodiments, the historical data may be obtained from logs of code representations correlated with performance metrics and with system specifications.

In some embodiments, the processor may analyze the representation of the code change. In some embodiments, the processor may identify that the representation of the code change includes one or more of the microservice container system specifications. For example, by analyzing the representation of the code change, the processor may be able to identify details about the microservice container system specifications (e.g., details about the microservice container system specifications may be incorporated in the code for a particular container).

In some embodiments, the AI model may be trained using historical data regarding: enterprise policy, private cloud configurations, current container configurations, container health and stability, container crash logs, calculated failure and rollback, downtimes, predicted outbreak down time, a history of outburst events, predicted outburst events, multi-cloud business information, estimated container changes, etc.

In some embodiments, determining recommended changes to system environments for the one or more microservice containers of the set of microservice containers may include identifying that/determining whether the recommended changes to system environments for the one or more microservice containers satisfy a resource criterion. In some embodiments, the recommended changes to system environments for microservice containers may be subject to one or more resource criteria. In some embodiments, the processor, based on information from the AI model, may determine recommended changes to the system environments for microservice containers based, at least in part, on cost considerations (e.g., constraints on cost or a minimization of costs).

In some embodiments, the processor, based on information from the AI model, may determine recommended changes to the system environments for microservice containers based, at least in part, on other resource criterion. For example, for an application that searches a database to determine if a guest at a hotel has a reservation, there may be 20 microservice containers performing various types of database searches regarding the guest's reservation. Constraints may be placed on the possible configurations for the system environments for the 20 microservice containers. For instance, there may be constraints (e.g., resource criterion to be satisfied) regarding the costs for the resources in the system environments, the number of processors, the total amount of memory used, the locations that the microservice containers are processed (e.g., a server in the U.S. rather than a server in Canada), etc.

In some embodiments, the AI model may be trained using user feedback from test cases of test system environments for test microservice containers. In some embodiments, the processor, based on the AI model, may provide a list of microservice container (e.g., a list of the top 10 containers ranked) for potential system environment changes to a user. In some embodiments, processor may provide a list of potential system environment changes (e.g., a list of the top 5 container configuration changes ranked) for one or more microservice containers to the user. In some embodiments, tests may be performed to evaluate each of the microservice containers in the list of microservice containers for potential system environment changes.

In some embodiments, tests may be performed to evaluate each of the potential system environments in the list of potential system environment changes. In some embodiments, as the viability (e.g., relating to performance characteristics of the microservice) of the changing system environments of the microservice containers in the list of potential microservice containers is assessed by the test cases, if the viability is below a threshold amount, the possibility of changing the system environment for that microservice container may be eliminated (and feedback regarding this is provided to the AI system).

In some embodiments, as the viability (e.g., relating to performance characteristics of the microservice) of the various changed system environment configurations on the list of potential system environment changes is assessed by the test cases, if the viability is below a threshold amount, the possibility of changing system environment configurations to that particular system environment may be eliminated (and feedback regarding this is provided to the AI system). In some embodiments, the viability of the changes (either the use of specific system environments or the changing the system environments of specific microservice containers) is evaluated based on performance and cost/other resource considerations.

In some embodiments, the best performing (e.g., based on performance characteristics of the microservice and optimization/reduction of resources and costs) changes to system environments (e.g., specific system environments on the list of potential system environments) may be implemented (e.g., in the software/code change deployment). In some embodiments, feedback regarding the selection of the best performing changes to system environments may be provided to the AI system. In some embodiments, feedback regarding the specific microservice container or containers selected from the list of potential microservice containers for system environment changes (e.g., based on their performance under test conditions in optimizing resource and cost considerations) may be provided to the AI system. In some embodiments, once the system environment changes for one or more microservice containers are implemented, feedback regarding its deployment may be provided to the AI system. In some embodiments, the feedback is provided at regular time intervals using real-time analysis of data regarding the deployment of the system environment changes.

Referring now to FIG. 1A, a block diagram of a system 100 for determining system environments for microservice containers is illustrated. System 100 includes a first device 102 and a cloud computing network 104. The cloud computing network 104 includes a system device 106 on which an AI model 108 operates. The cloud computing network 104 also includes datacenter server 110A and datacenter server 110B. The first device 102, system device 106, datacenter server 110A, and datacenter server 110B are configured to be in communication with each other. The first device 102 and the system device 106 may be any devices that contain a processor configured to perform one or more of the functions or steps described in this disclosure.

In some embodiments, a processor of the system device 106 identifies an occurrence of a code change in a repository 118 on the first device 102. The processor of system device 106 generates a representation of the code change. The processor then identifies a set of microservice containers having microservices affected by the code change. The processor of system device 106 may identify, for example, that a first microservice container 112 on datacenter server 110A, a third microservice container 112 on datacenter server 110A, and a fourth microservice container 116 on datacenter server 110B have microservices affected by the code change. The processor of system device 106 then determines recommended changes to system environments for one or more microservice containers of the set of microservice containers. The processor of system device 106 may determine changes to system environments for, for example, the first microservice container 112 on datacenter server 110A and the fourth microservice container 116 on datacenter server 110B.

In some embodiments, the processor of system device 106 may identify that the recommended changes to the system environment for the first microservice container 112 and/or the fourth microservice container 116 satisfy a resource criterion. For example, the resource criterion may include a threshold value. In some embodiments, the processor of system device 106 communicates with datacenter server 110A and datacenter server 110B to automatically apply the recommended changes to system environments to the first microservice container 112 and the fourth microservice container 116.

Figure 1B:
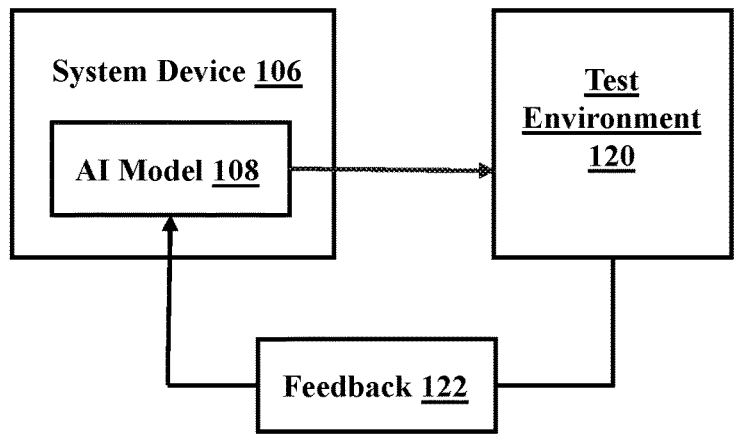
FIG. 1B is a block diagram of components of an exemplary system for determining system environments for microservice containers, in accordance with aspects of the present disclosure.

Referring now to FIG. 1B, a block diagram illustrating the AI model 108 of system device 106 is illustrated. In some embodiments, the AI model 108 is trained using user feedback 122. The output from the AI model 108 may be a recommendation of the top 10 microservice containers and a recommendation of the top 5 system environments for the microservice containers based on cost or other considerations. These recommended containers and configurations are tested in a test environment 120. The performance of the recommended containers and configurations may be assessed in the test environment 120 and feedback 122 provided to the AI model 108. The feedback 122 may improve the accuracy of the AI model 108. In some embodiments, the feedback 122 may relate to the viability of the recommended containers and configurations (e.g., their performance above or below a threshold). In some embodiments, the AI model 108 may receive regular feedback 122 for improved accuracy. In some embodiments, AI model 108 may utilize reinforcement learning techniques. In some embodiments, AI model 108 may utilize advanced ensemble techniques such as bagging, boosting, stacking, etc. In some embodiments, AI model 108 may utilize any other architectures utilized to solve random forest problems.

Figure 2:
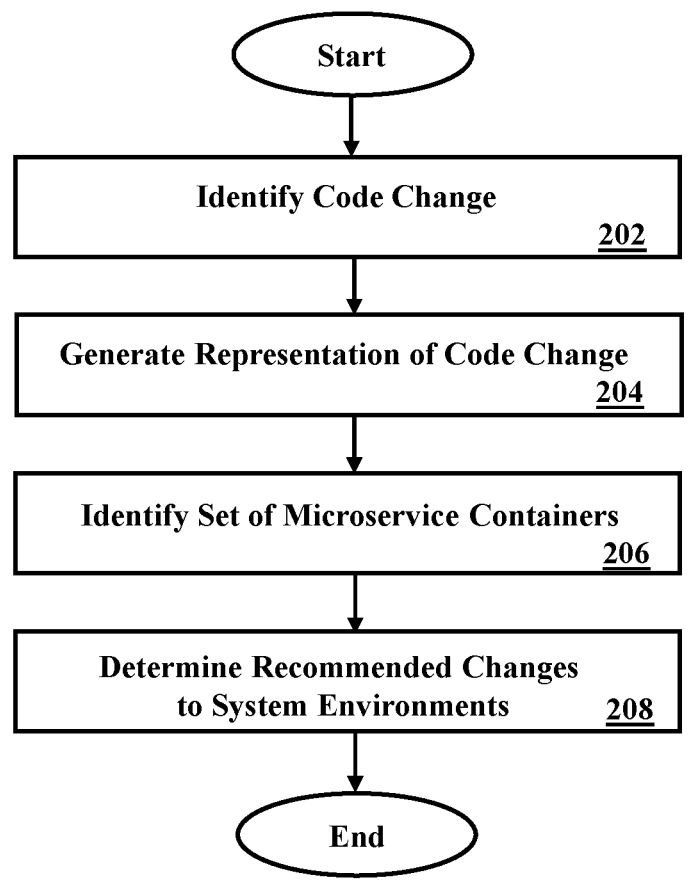
FIG. 2 is a flowchart of an exemplary method for determining system environments for microservice containers, in accordance with aspects of the present disclosure.

Referring now to FIG. 2, illustrated is a flowchart of an exemplary method 200 for determining system environments for microservice containers, in accordance with embodiments of the present disclosure. In some embodiments, a processor of a system may perform the operations of the method 200. In some embodiments, method 200 begins at operation 202. At operation 202, the processor identifies an occurrence of a code change for a microservice hosted in a container. In some embodiments, method 200 proceeds to operation 204, where the processor generates a representation of the code change. In some embodiments, method 200 proceeds to operation 206. At operation 206, the processor identifies, utilizing an AI model, a set of microservice containers having microservices affected by the code change. In some embodiments, method 200 proceeds to operation 208. At operation 208, the processor determines recommended changes to system environments for one or more microservice containers of the set of microservice containers.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
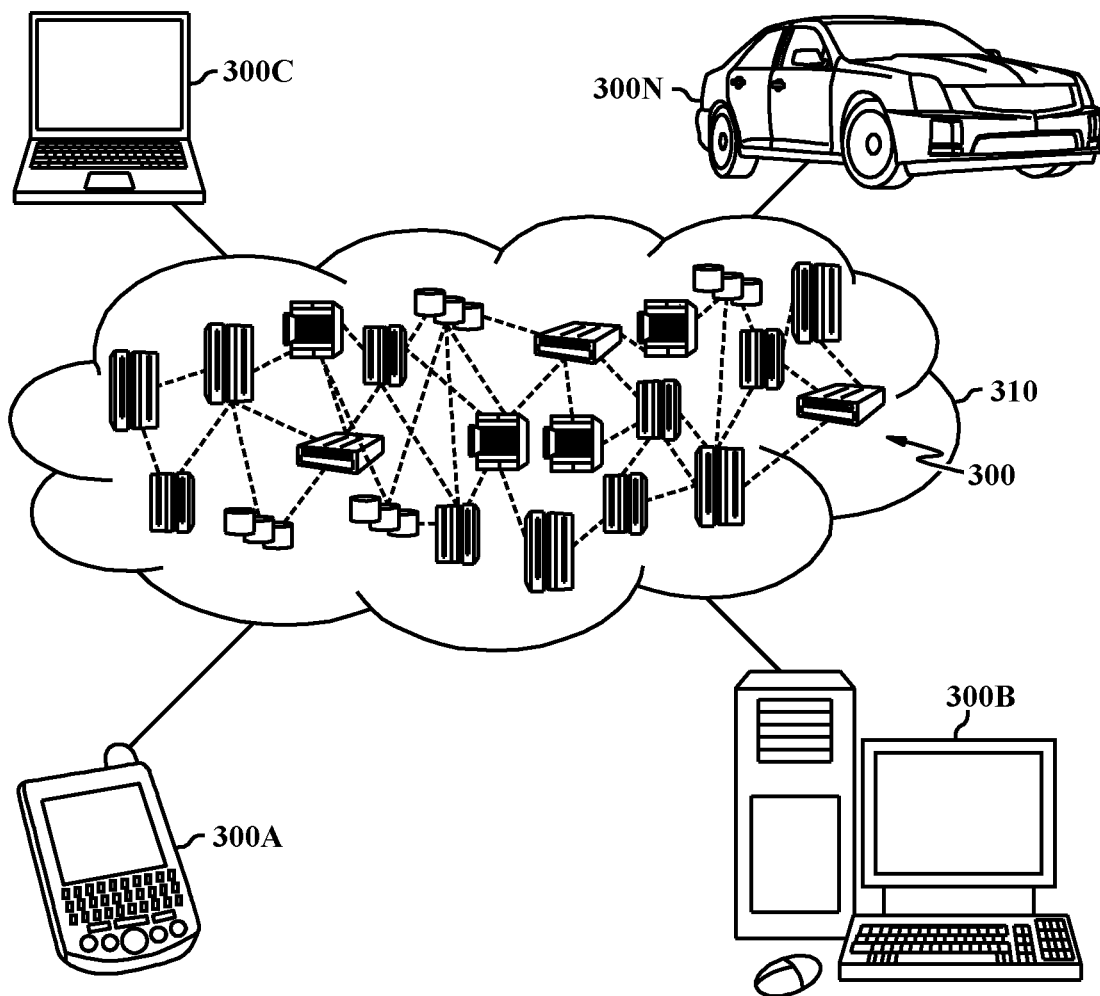
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
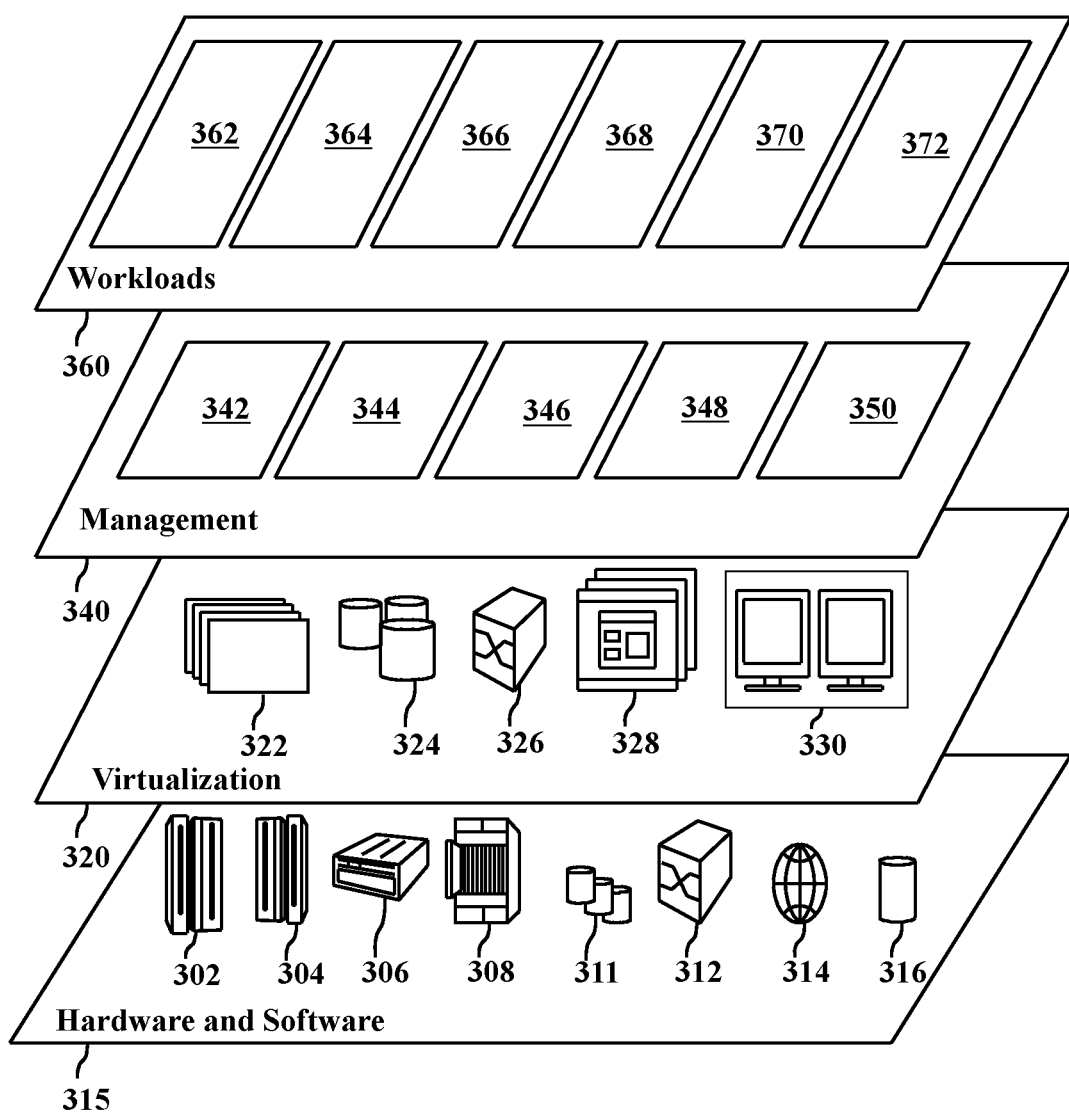
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and determining system environments for microservice containers 372.

Figure 4:
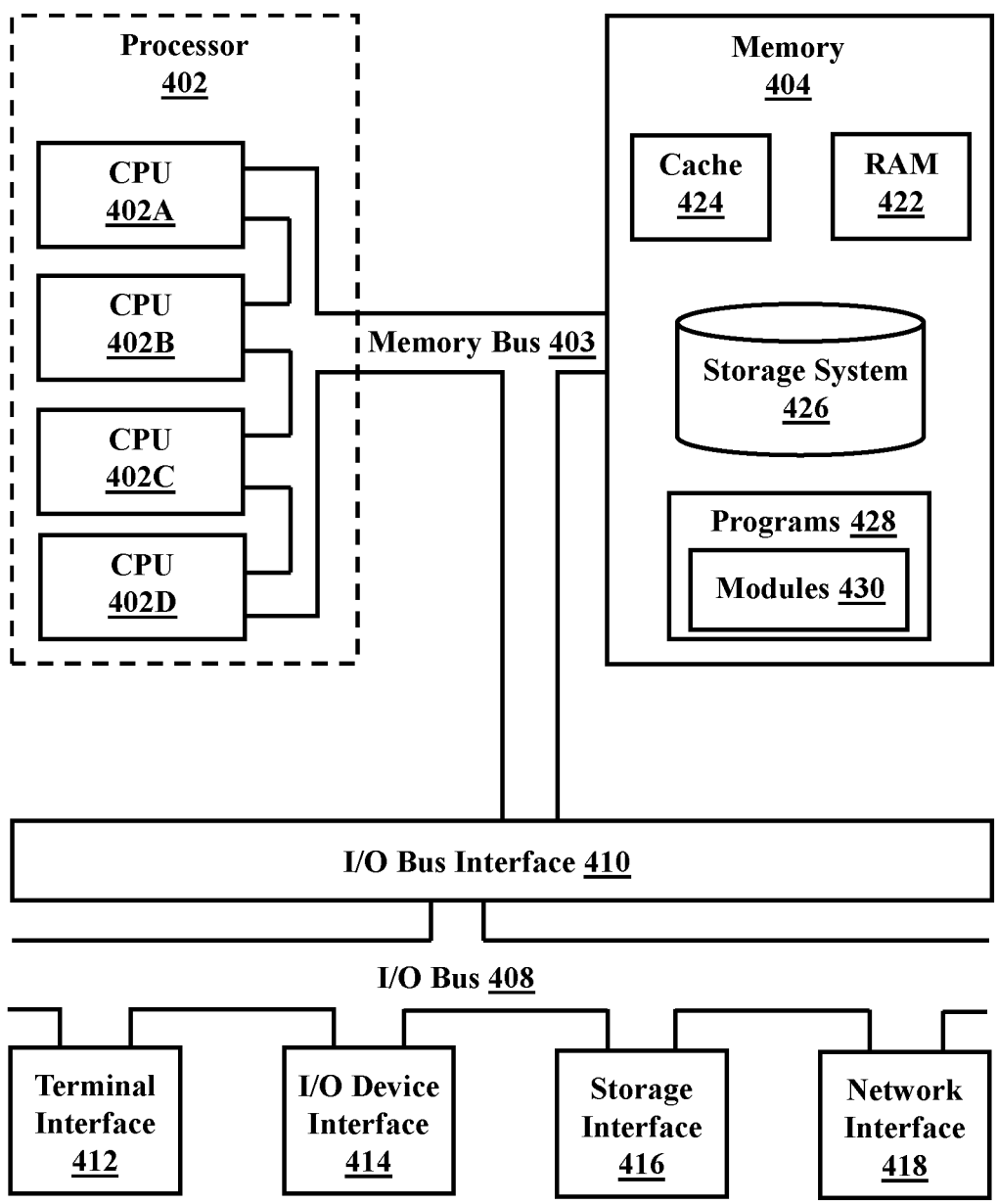
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for determining system environments for microservice containers, the method comprising:
   identifying, by a processor, an occurrence of a code change for a microservice hosted in a container;
   generating a representation of the code change;
   identifying, utilizing an AI model, a set of microservice containers having microservices affected by the code change; and
   determining recommended changes to system environments for one or more microservice containers of the set of microservice containers.

2. The method of claim 1, wherein the AI model is trained using user feedback from test cases of test system environments for test microservice containers.

3. The method of claim 1, wherein identifying the set of microservice containers includes determining one or more container dependencies.

4. The method of claim 1, wherein the AI model is trained using historical data correlating microservice container system specifications and microservice performance metrics.

5. The method of claim 1, further comprising:
   analyzing the representation of the code change; and
   identifying that the representation of the code change includes one or more of the microservice container system specifications.

6. The method of claim 1, wherein determining recommended changes to system environments for the one or more microservice containers of the set of microservice containers includes:
   identifying that the recommended changes for the one or more microservice containers satisfy a resource criterion.

7. The method of claim 1, further comprising:
   applying, automatically, the recommended changes to system environments, wherein the recommended changes allow the microservice to run without interruption.

8. A system comprising:
   a memory; and
   a processor in communication with the memory, the processor being configured to perform operations comprising:
   identifying an occurrence of a code change for a microservice hosted in a container;
   generating a representation of the code change;
   identifying, utilizing an AI model, a set of microservice containers having microservices affected by the code change; and
   determining recommended changes to system environments for one or more microservice containers of the set of microservice containers.

9. The system of claim 8, wherein the AI model is trained using user feedback from test cases of test system environments for test microservice containers.

10. The system of claim 8, wherein identifying the set of microservice containers includes determining one or more container dependencies.

11. The system of claim 8, wherein the AI model is trained using historical data correlating microservice container system specifications and microservice performance metrics.

12. The system of claim 8, wherein the operations further comprise:
   analyzing the representation of the code change; and
   identifying that the representation of the code change includes one or more of the microservice container system specifications.

13. The system of claim 8, wherein determining recommended changes to system environments for the one or more microservice containers of the set of microservice containers includes:
   identifying that the recommended changes for the one or more microservice containers satisfy a resource criterion.

14. The system of claim 8, wherein the operations further comprise:

applying, automatically, the recommended changes to system environments, wherein the recommended changes allow the microservice to run without interruption.

15. A computer program product comprising a computer readable storage medium having program instructions embodied therewith, the program instructions executable by a processor to cause the processor to perform operations, the operations comprising:

identifying an occurrence of a code change for a microservice hosted in a container;

generating a representation of the code change;

identifying, utilizing an AI model, a set of microservice containers having microservices affected by the code change; and determining recommended changes to system environments for one or more microservice containers of the set of microservice containers.

16. The computer program product of claim 15, wherein the AI model is trained using user feedback from test cases of test system environments for test microservice containers.

17. The computer program product of claim 15, wherein identifying the set of microservice containers includes determining one or more container dependencies.

18. The computer program product of claim 15, wherein the AI model is trained using historical data correlating microservice container system specifications and microservice performance metrics.

19. The computer program product of claim 15, wherein determining recommended changes to system environments for the one or more microservice containers of the set of microservice containers includes:

identifying that the recommended changes for the one or more microservice containers satisfy a resource criterion.

20. The computer program product of claim 15, wherein the operations further comprise:

applying, automatically, the recommended changes to system environments, wherein the recommended changes allow the microservice to run without interruption.

* * * * *